April 22, 1969   R. W. NIELSEN   3,440,505
SERVOMECHANISM DRIVE SYSTEM
Filed Feb. 21, 1966
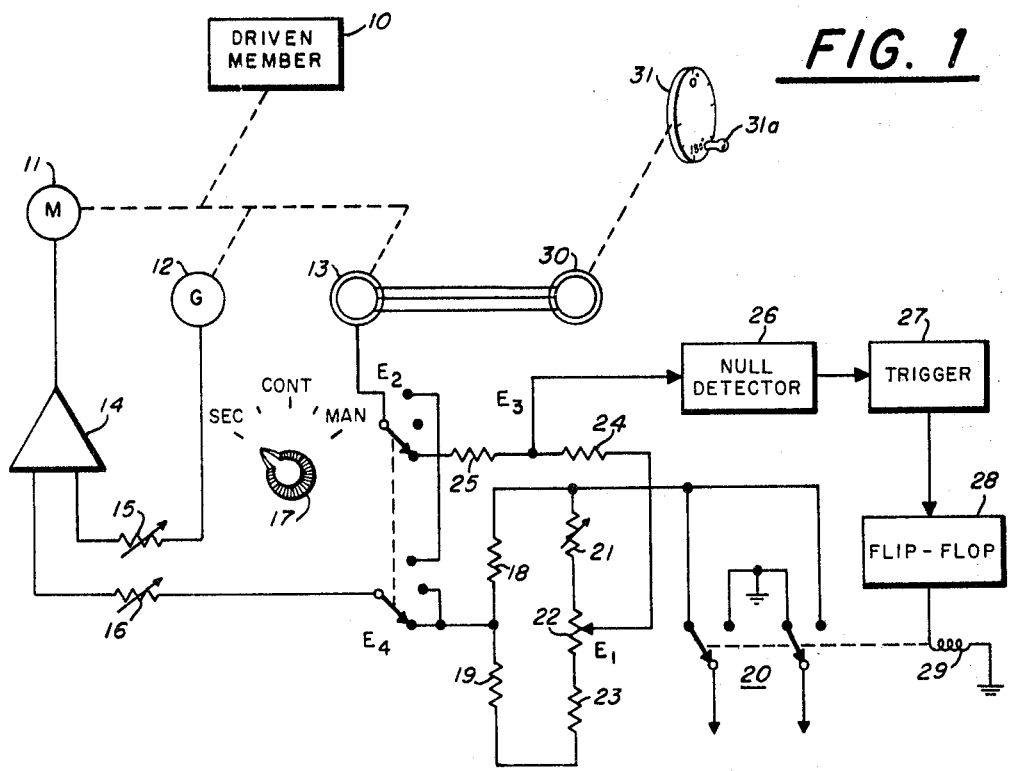
FIG. 1
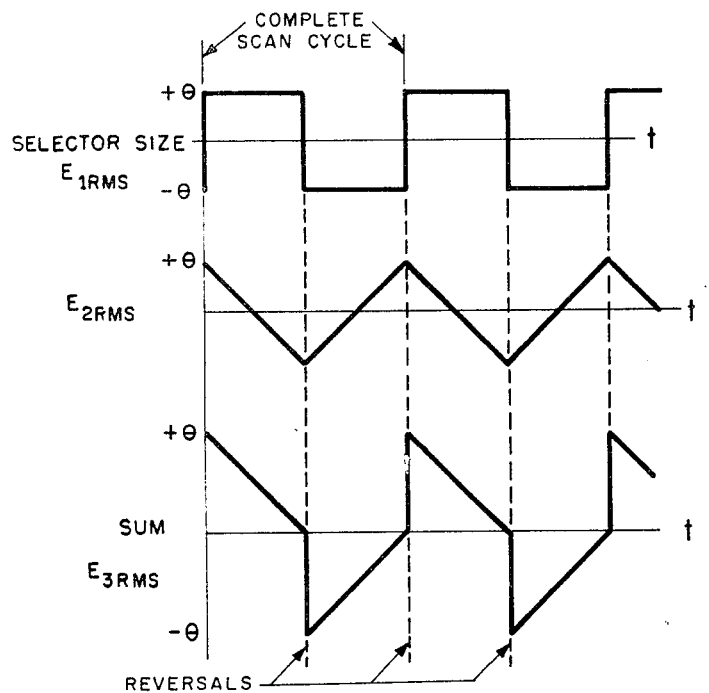
FIG. 2a
FIG. 2b
FIG. 2c
INVENTOR.
ROBERT W. NIELSEN
BY
ATTORNEYS United States Patent Office 3,440,505
Patented Apr. 22, 1969

3,440,505
SERVOMECHANISM DRIVE SYSTEM
Robert W. Nielsen, Sepulveda, Calif., assignor, by mesne assignments, to the United States of America as represented by the Secretary of the Navy
Filed Feb. 21, 1966, Ser. No. 531,631
Int. Cl. G05b *13/02;* G01s *3/02*
U.S. Cl. 318—30       6 Claims

ABSTRACT OF THE DISCLOSURE

A reversible servomechanism drive system is disclosed in which the sector scan mode of operation may be selectively adjusted to scan a desired azimuthal sector about any desired bearing chosen as the sector scan. When the driven member reaches the maximum selected sector excursion, a null is developed between an electrical input signal and an electrical signal generated as a function of the position of the driven member. The null signal causes a change in phase of the electrical input signal thereby driving the driven member in the opposite direction toward the opposite point of maximum selected sector excursion. A means is also provided to control the speed of scan together with the selected sector and bearing.

---

The present invention is concerned with a servomechanism drive system and more particularly to such a system which is particularly and uniquely adapted to afford a sector servomechanism drive having selective adjustment of the direction and degree of the scan provided by the system.

Many prior art systems have been developed for providing various kinds of servomechanism drive functions. Included among these types of drives are manually controlled drives, continuous drives, and those drives which are limited to a determinable or selective sector of scan. Generally, in the prior art servomechanism drive systems, electro-mechanical limit switching and/or phase-sensitive detectors were employed to control and reverse the direction of scan in a sector scan-type system.

As is appreciated by those versed in the prior art, the sector scan mode of operation requires that a servomechanism drive system scan between certain limitations usually in azimuth or elevation as defined by the extreme limits of the desired sector. Accordingly, it is required that some means be provided to reverse the servomechanism drive when a limit of such sector scan is reached. Upon reversal of the servomechanism drive system, its direction is changed so that it is driven toward and eventually reaches the other limit which, together with the first limit point, defines the two extremes of the sector being scanned. In a like manner, upon reaching the second limit point, the servomechanism drive system is required to be reversed so that it is driven in the first direction again and this procedure and operation continues indefinitely under the control of an operator or another portion of the system which preferably is selectively adjustable to determine the direction of such scan and its extent angularly so as to define the sector as well as the center point or bearing about which such sector scanning is to be performed.

Many earlier prior art systems employed electromechanical limit switches which were placed at or near the limits of sector scanning servomechanism drive systems so that the driven member would, upon reaching the limit point, mechanically contact and actuate an electrically connected switch to cause reversal of the drive. Other prior art systems have employed phase-sensitive detectors to control and reverse the direction of scan when the driven member reaches the limit of the sector it is desired to scan.

Accordingly, it is a prime object of the present invention to eliminate disadvantages of prior art systems which were inherent in electro-mechanical switches actuated by the driven member in a servomechanism drive system.

Another object of the present invention is to provide a servomechanism drive system which will operate within a selected sector of scan without employing phase detection or electro-mechanical reversing devices positioned at the limit points of the sector to be scanned.

Yet another object of the present invention is to provide a servomechanism drive system capable of scanning a selected sector in any desired direction and which uses a null detection and electronically actuated drive reversal means.

Another object of the present invention is to provide such a servomechanism drive system affording selectability of sector size as well as direction and adaptable to be operated in continuous scan and manually controlled scan as may be desired.

In its preferred embodiment the servomechanism drive system of the present invention may comprise the driven member together with appropriate driving means for positioning the driven member through a distance commensurate with the amplitude of an electrical input signal. The driving means is arranged to drive in one of two directions in accordance with the phase of the input electrical signal. Means are provided for developing an electrical signal as a function of the position of the driven member. A source of electrical input signal is provided, as well as means for summing the electrical input signal with the electrical signal developed as a function of the position of the driven member. An appropriate null detector arrangement is connected to receive the summed signals and a means is provided which is responsive to a null condition detected by the null detector for causing phase reversal of the electrical input signal.

Accordingly, the driving means is caused to drive the driven member of the servomechanism drive system in the opposite direction and the same sequence of steps repeats itself until a null is detected by the null detector at the opposite limit point of the sector to be scanned and the driven member is again caused to be driven in the opposite direction by the driving means. Thus the present invention is a servomechanism drive system in which the limit points of sector scan may be selectively adjusted as to size or degree of scan and in which the limit points of the sector scan are detected by reason of a signal developed by the driven member commensurate with its spatial disposition, which signal, when summed with an electrical input signal, results in a null at each limit point. The limit point theefore is detected by a wholly electronic means rather than by an electromechanically actuated device as was common in many prior art systems.

These and other objects, advantages and features of the present invention will be better understood from the description of an embodiment which follows together with the illustrative drawings and the scope of the invention will be pointed out more particularly in the appended claims.

In the drawings:

FIG. 1 is a schematic block diagram illustrating an embodiment of the present invention;

FIGS. 2a, b and c are graphical illustrations of the approximate waveshape of signals which are developed in the course of typical operation of the present invention.

As illustrated in FIG. 1 the present invention may be embodied in a combination of apparatus to drive a driven member such as that symbolically illustrated at 10. The driven member 10 is arranged to be mechanically driven by an electrical motor 11 which, in turn, is mechanically linked to drive an electrical generator means 12 and a synchro 13. The electric motor 11 is provided with a driving signal by the amplifier 14 having two inputs, one of which is derived from the electrical generator 12, and the other derived from the circuitry which will be described more fully hereinafter. The electrical signal generated by the generator 12 is adjustable as to amplitude by means of a serially connected adjustable resistor 15. Similarly, the second input to the amplifier 14 is adjustable to provide gain control for the amplifier by means of an adjustable resistor 16. A mode control switch 17 controls the mode of operation of the servomechanism drive which may be seleceted as "SECTOR," "CONTINUOUS," or "MANUAL."

The illustration of the embodiment of FIG. 1 shows the mode control switch 17 positioned in the sector scanning mode of operation. In this position one of the inputs to the amplifier 14 is derived by the lowermost contact of the mode selector switch 17 which shows connection with a point between two resistors 18 and 19. A source of electrical input signal, which may in a typical instance be 55 volts alternating current, is connected to the input terminals of a reversably connectable relay arrangement 20. In the position shown in the illustration of FIG. 1, the source of input voltage is impressed upon a bridge-type arrangement composed of resistors 18 and 19 in one arm, and the adjustable resistance 21, the variable tap resistance 22, and the fixed resistor 23 in the other arm. The potential developed at the tap of the variable tap resistor 22 is connected to a resistor 24 where it is summed with the potential developed by a resistor 25.

The potential realized across resistor 25 is that developed by the synchro 13 and the sum of the potentials developed across resistors 24 and 25 is connected as the input to a null detector 26. The output of the null detector 26 is connected to an appropriate trigger circuit 27 which, in turn, provides an input for the flip-flop 28. The output of the flip-flop 28 operates upon the coil 29 of the reversable relay which actuates the contact points 20 previously described. The synchro 13 has a remotely located counterpart in the form of a synchro member 30 which is arranged to have a rotatable element positionable so as to develop an appropriate signal at its associated member 13, which signal is commensurate with the spatial disposition of the rotatable member of the remote synchro 30. The rotatable member 31 of the synchro 30 is schematically illustrated as being positionable by a typical hand crank 31a illustrated as having three hundred and sixty degree divisions so as to provide orientation of the rotatable member at any desired position around a full circle.

The electronic scan generator circuit shown in FIG. 1 which comprises the servomechanism drive system of the present invention is capable of providing three different modes of operation. These three modes of operation are manual, continuous and sector-scan. The manual operation is one by which the controlling signal is developed in a means such as the remote synchro member 30 by appropriate positioning of its rotatable member 31. In that state of operation, the mode selector switch is switched to "MANUAL" so that the signal developed at the synchro 13 is connected to the upper contact point of the switch means 17 and is thereby connected directly to the amplifier 14 to actuate the motor 11 accordingly. Thus the positioning of the driven member 10 is caused to be manually controlled and directed as desired.

A second mode of operation may be designated as continuous scan, in which the driven member 10 is caused to continuously scan in rotation without reversing direction. In the continuous scan no limit points are designated so that the driven member merely continues to rotate in its scan. This mode of operation is accomplished by the mode selector switch 17 being positioned to its mid-position designated "CONTINUOUS" so that the input developed by the synchros 30 and 13 are disconnected from the amplifier 14. The input from the bridge circuit comprising the resistors 18 and 19 in one arm, and the resistor elements 21, 22 and 23 in the other arm, is impressed upon and connected into the amplifier 14 so as to continuously drive the motor 11 and thereby continually cause rotation of the driven member 10. It should be noted that the summing circuit arrangement, comprising the resistive elements 24 and 25, is not connected operatively into the circuit in this continuous mode of operation. The signal developed at the synchro 13 is not connected to develop a signal across the resistive element 25, and the input to the null detector 26 is constantly and consistently the potential developed across the resistive element 24. Since a null cannot be achieved under this condition and arrangement, the servo-mechanism drive system continues to rotatably drive the driven member 10.

The third and most important mode of operation of the servomechanism drive system illustrated by the embodiment of FIG. 1 is the sector scan mode of operation. This mode of operation provides a servomechanism drive system having a sector of scan angle which is variable from $\pm 5°$ to $\pm 80°$ and which sector may be automatically scanned about any center bearing from 0 to 360°. The sector scan mode of operation of the embodiment of FIG. 1 is as follows: Initially a voltage, which may be designated as $E_1$, is developed at the tap of the tapped resistive element 22 which is connected to appear across the resistive element 24. This potential is added to the potential derived from the synchro 13 which is a commensurate indicia of the instantaneous position of the driven member 10 since the synchro 13 is mechanically positioned by the driven member 10 as is schematically illustrated by the dash-line connections. This provides a potential which is the resultant sum of $E_1$ and $E_2$ and may be described as the synchro position reference voltage $E_3$. The potential $E_3$ is connected to the input of the null detector 26. In the other portion of the bridge circuit, the resistors 18 and 19 provide a constant error voltage $E_4$ at their common connection point, which error voltage, $E_4$, is connected through the variable resistor 16 to provide an input to the amplifier 14 for the purpose of driving the motor 11.

The phase of the error voltage $E_4$ is appropriate to cause the driving means shown in FIG. 1 in the form of electrical motor 11, in a direction which will decrease the voltage $E_3$. As the voltage $E_3$ decreases in response to the constantly varying position of the synchro 13, a point is reached where the respective potentials developed across the resistive elements 24 and 25 are equal and of opposite phase sense. Therefore, a null is realized which is sensed by the null detector 26. Upon the realization and detection of the null point, the trigger 27 is actuated causing the flip-flop 28 to be triggered to its opposite condition, actuating the reversing relay 29 whereupon the connections of the source of input signal 20 are reversed with respect to ground and high potential. Accordingly, the voltages $E_1$ realized at the tap of the tapped resistive element 22 and the voltage $E_4$ which is developed at the common connection of resistive elements 18 and 19 are reversed. This causes the servomechanism drive means in the form of the motor 11 to reverse its direction and drive the driven member 10 in the opposite direction to again bring the sum voltage $E_3$ to a null realized at the common connection between resistive elements 24 and 25. This null is achieved at the opposite limit point which defines the sector it is desired to scan and when realized causes a repetitive sequence of operation in an opposite direction.

By adjusting the adjustable resistive element 21, the 80° of sector may be commensurately adjusted. By varying the position of the variable tap of the resistive means 22, the size of the sector to be scanned may be adjusted from 5° to 80°. The adjustment of the rotatable member 31 of the synchro 30 provides an appropriate input as developed at the remote synchro member 13, determinative of the center point about which the selected sector is scanned. In other words, the position of the rotatable member 31 of synchro 30 determines the bearing, for instance, about which the servomechanism drive system will continuously drive the driven member 10 in a sector scan mode of operation.

An advantage of the present invention is that the sector bearing of sector scan may be changed at will at any time while the automatic sector scan mode of operation is being performed. Means are provided in the connection from the tachometer type feedback generator 12 to the amplifier 14 so that the speed of the scan may be governed and selectively varied as desired within a selected sector of scan without disturbing or changing in any way the sector of scan, or without disturbing the center bearing about which the sector scan mode of operation is being performed.

The FIGS. 2a, 2b and 2c illustrate the waveform of typical signals which are developed in the course of operation of the servomechanism drive system of the present invention when it is operating in its automatic sector scan mode. FIG. 2a shows a square waveform of the potential $E_1$ which is the alternating current voltage developed at the tap of the tapped resistive element 22. This, as will be observed from FIG. 2a, is a constant voltage which does not vary in amplitude once the tap of the resistive element 21 has been selectively adjusted and the resistive value of the variable resistor 21 has been similarly selectively adjusted.

Upon the actuation of the reversing relay 29, the input connections of the source of input signal impressed across the input terminals 20 are reversed with respect to ground and higher potential, therefore reversing by 180° the phase of the input signal. Thus with the actuation of the flip-flop 28 and the reversing relay 29, respectively, a potential of like amplitude is developed as the tap of the resistive element 22 but of opposite phase as shown in FIG. 2. As illustrated this signal is in the form of a substantially square wave type of signal and reverses within a complete scan cycle. The voltage developed at the synchro 13 is of constantly changing amplitude due to the continually changing position of the synchro as it is driven in accordance with the instantaneous position of the driven member 10. Thus, the voltage $E_2$ developed by the synchro 13 as an output to be impressed upon and developed across the resistive element 25, is of a constantly changing character as shown in FIG. 2b, declining from a positive amplitude to zero and to a like negative amplitude, thence reversing through a constantly decreasing amplitude of negative signal through zero and to a like amplitude of positive signal in a constant slope.

The two signals as shown in FIGS. 2a and 2b are summed at the point of common connection between the resistive elements 24 and 25 which sum is shown as $E_3$, the waveform illustrated by FIG. 2c. This waveform is shown as being initially a positive potential, gradually declining to a zero potential, i.e., a null, and at this null point the null detector is responsive to actuate the trigger which, in turn, causes the flip-flop 28 to be actuated into its opposite state. Accordingly, the reversing relay 29 reverses the phase of the input signal which is impressed across the bridge-like arrangement of the resistor elements 21, 22, 23, 18 and 19, thereby reversing the phase of the input to the amplifier 14 and consequently reversing the phase of the input to the motor 11 causing it to operate in the opposite direction so that the driven member 10 is then driven in a direction opposite to that which has previously been the case.

This operation is then repeated until a null is realized at the pre-established and selectively determined position which marks the limit point of the sector it is desired to scan. This reversing operation continues upon each such null detected at opposite limit points of the sector defining the degree and extent of the scan.

Those skilled in the art will realize that the present invention provides a servomechanism drive system in which the limit points are electrically established and electronically detected without the use of mechanically actuated switches, arms, levers or other devices which in much of the prior art forms of functionally comparable systems have been the cause of and subject to defective operation, largely because of susceptibility to wear and maintenance problems.

Moreover, the servomechanism drive system of the present system, when operating in the sector scan mode of operation, may be changed as to center bearing at will by a convenient and readily made adjustment without stopping the scanning operation. Additionally, the sector's size may be adjusted readily by adjusting a single variable means during the actual operation of the sector scan mode.

These and other desirable results, features and advantages of the present invention are achieved without sacrificing the multiple modes of operation which are incorporated in the embodiments of the present invention as illustrated by FIG. 1 wherein convenient readily accessible means are provided for selecting a manually controlled mode of operation or a continuous scan mode of operation as may be necessary or desirable.

Obviously many modifications and variations of the present invention are possible in the light of the above teachings. It is therefore to be understood that within the scope of the appended claims the invention may be practiced otherwise than as specifically described.

What is claimed is:
1. A servomechanism drive system comprising;
a driven member; driving means for driving said driven member through a distance commensurate with the amplitude of an electrical input signal and in one of two directions in accordance with the phase of said electrical input signal;
means developing an electrical signal as a function of the position of said driven member;
a source of electrical input signal;
means for summing said electrical input signal with said electrical signal developed as a function of the position of said driven member;
a null detector connected to receive said summed signals; and
means responsive to said null detector for changing the phase of said electrical input signal.
2. A servomechanism drive system in accordance with claim 1 wherein said means responsive to said null detector is operative to change the phase of said electrical input signal by 180°.
3. A servomechanism drive system in accordance with claim 1 wherein said source of electrical input signal is selectively variable in amplitude.
4. A servomechanism drive system in accordance with claim 1 and including means for selectively disconnecting said signal developed as a function of the position of said driven member.
5. A servomechanism drive system in accordance with claim 1 wherein said means for developing an electrical signal as a function of the position of said driven member includes means for selectively changing the amplitude and phase of said signal developed.
6. A servomechanism drive system in accordance with claim 5 wherein said means for developing an electrical signal as a function of the positon of said driven member is a synchro receiver electrically connected to a sending synchro and mechanically positioned by said driven member.

References Cited

UNITED STATES PATENTS

| | | | |
|---|---|---|---|
| 2,403,605 | 7/1946 | Lesnick | 318—30 |
| 2,415,080 | 2/1947 | Bonell | 318—30 |
| 2,418,306 | 4/1947 | Lesnick et al. | 318—30 |
| 3,141,120 | 7/1964 | Johnson et al. | 318—28 XR |
| 3,281,844 | 10/1966 | Sabin | 343—112 |

RODNEY D. BENNETT, Jr., *Primary Examiner.*

JEFFREY P. MORRIS, *Assistant Examiner.*

U.S. Cl. X.R.

343—112